US008699653B2

(12) United States Patent
Drudy et al.

(10) Patent No.: US 8,699,653 B2
(45) Date of Patent: Apr. 15, 2014

(54) METHOD OF ACHIEVING AUTOMATIC AXIAL POWER DISTRIBUTION CONTROL

(75) Inventors: Keith J. Drudy, New Kensington, PA (US); Norman P. Mueller, Trafford, PA (US); Elijah A. Richter, Pittsburgh, PA (US)

(73) Assignee: Westinghouse Electric Company, LLC, Cranberry Township, PA (US)

( * ) Notice: Subject to any disclaimer, the term of this patent is extended or adjusted under 35 U.S.C. 154(b) by 413 days.

(21) Appl. No.: 13/279,596

(22) Filed: Oct. 24, 2011

(65) Prior Publication Data
US 2013/0101077 A1    Apr. 25, 2013

(51) Int. Cl.
G21C 7/117    (2006.01)
G21C 7/08    (2006.01)
G21C 7/36    (2006.01)
G21C 7/00    (2006.01)

(52) U.S. Cl.
USPC ........... 376/237; 376/207; 376/215; 376/216; 376/217; 376/219; 376/236; 376/238

(58) Field of Classification Search
CPC ......... Y02E 30/00; Y02E 30/30; Y02E 30/39; Y02E 30/40; G21C 7/00; G21C 7/005; G21C 7/06; G21C 7/08; G21C 7/10; G21C 7/117; G21C 7/12; G21C 7/36; G21D 3/00; G21D 3/001; G21D 3/08; G21D 3/10; G21D 3/12; G21D 3/14; G21D 3/16
USPC ......... 376/207, 215–217, 219, 236–238, 240, 376/241, 244, 245, 246, 247, 254, 255, 327, 376/333
See application file for complete search history.

(56) References Cited

U.S. PATENT DOCUMENTS

| 4,222,822 | A  | * | 9/1980 | Mueller et al. ................ 376/217 |
| 4,470,949 | A  | * | 9/1984 | Deroubaix et al. ........... 376/217 |
| 4,717,528 | A  | * | 1/1988 | Meyer et al. .................. 376/237 |
| 4,774,050 | A  | * | 9/1988 | Impink, Jr. .................... 376/245 |
| 4,844,856 | A  | * | 7/1989 | Cohen et al. .................. 376/217 |
| 5,217,678 | A  | * | 6/1993 | Fukasawa ..................... 376/237 |
| 7,412,021 | B2 | * | 8/2008 | Fetterman et al. ............ 376/327 |
| 8,527,668 | B2 | * | 9/2013 | DiBartolomeo et al. ..... 376/245 |
| 2008/0069288 | A1 | | 3/2008 | Grossetete |
| 2009/0046824 | A1 | | 2/2009 | Pomirleanu et al. |
| 2011/0002435 | A1 | | 1/2011 | Lu et al. |

OTHER PUBLICATIONS

Drudy, K. J. et al., "Robustness of the MSHIM Operation and Control Strategy in the AP1000 Design," Proceedings of the 17th International Conference on Nuclear Engineering, Jul. 12-16, 2009, Brussels, Belgium, ASME.
Westinghouse Electric Company LLC, PCT Appl. No. PCT/US12/59628, PCT International Search Report, Jul. 11, 2013, 7 pages.

* cited by examiner

*Primary Examiner* — Bernarr Gregory
(74) *Attorney, Agent, or Firm* — Joseph C. Spadacene; Westinghouse Electric Company, LLC

(57) ABSTRACT

A control strategy for a pressurized water nuclear reactor that employs separate, independent control rod banks for respectively controlling $T_{avg}$ and axial offset within corresponding deadbands. The strategy does not permit the control banks controlling reactor core power and the control banks controlling axial offset to move together, but normally gives preference to the control banks controlling the $T_{avg}$ except when a demand signal is received simultaneously by both independent control rod banks to move in a same direction, in which case, the control bank compensating for the axial offset is given preference.

3 Claims, 10 Drawing Sheets

METHOD OF ACHIEVING AUTOMATIC AXIAL POWER DISTRIBUTION CONTROL

BACKGROUND

1. Field

This invention pertains generally to a method for operating a pressurized water nuclear reactor and more particularly to a method for automatically controlling the average coolant temperature and the axial power distribution of such a reactor.

2. Description of the Related Art

The primary side of nuclear reactor power generating systems which are cooled with water under pressure comprises a closed circuit which is isolated and in heat exchange relationship with a secondary circuit for the production of useful energy. The primary side comprises the reactor vessel enclosing a core internal structure that supports a plurality of fuel assemblies containing fissile material. The primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump, and the system of pipes which are connected to the vessel form a loop of the primary side.

For the purpose of illustration, FIG. 1 shows a simplified nuclear reactor primary system, including a generally cylindrical pressure vessel 10 having a closure head 12 enclosing a nuclear core 14. A liquid reactor coolant, such as water or borated water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purpose of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel through one or more inlet nozzles 30, flows down through an annulus between the reactor vessel and the core barrel 32, is turned 180° in a lower plenum 34, passes upwardly through a lower support plate 37 and a lower core plate 36 upon which the fuel assemblies are seated and through and about the assemblies. In some designs, the lower support plate 37 and the lower core plate 36 are replaced by a single structure, a lower core support plate having the same elevation as 37. The coolant flow through the core and surrounding areas 38 is typically large on the order of 400,000 gallons per minute at a velocity of approximately 20 feet per second. The resulting pressure drop and friction of forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more coolant nozzles 44.

The upper internals 26 can be supported from the vessel or the vessel head and include an upper support assembly 46. Loads are transmitted between the upper support assembly 46 and the upper core plate, primarily by a plurality of support columns 48. A support column is aligned above a selected fuel assembly 22 and perforations 42 in the upper core plate 40.

Rectilinearly moveable control rods 28, which typically include a drive shaft 50 and spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is of the type used in a pressured water reactor and has a structural skeleton which, at its lower end, includes a bottom nozzle 58. The bottom nozzle 58 supports the fuel assembly 22 on the lower core plate 36 in the core region of the nuclear reactor. In addition to the bottom nozzle 58, the structural skeleton of the fuel assembly 22 also includes a top nozzle 62 at its upper end and a number of guide tubes or thimbles 84 which align with the guide tubes 54 in the upper internals. The guide tubes or thimbles 84 extend longitudinally between the bottom and top nozzles 58 and 62 and at opposite ends are rigidly attached thereto.

The fuel assembly 22 further includes a plurality of transverse grids 64 axially spaced along and mounted to the guide thimbles 84 and an organized array of elongated fuel rods 66 transversely spaced and supported by the grids 64. Also, the fuel assembly 22, as shown in FIG. 3, has an instrumentation tube 68 located in the center thereof that extends between and is captured by the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70 composed of fissile material, are responsible for creating the reactive power of the reactor. The cladding which surrounds the pellets functions as a barrier to prevent the fission byproducts from entering the coolant and further contaminating the reactor system.

To control the fission process, a number of control rods 78 are reciprocally moveable in the guide thimbles 84 located at predetermined positions in the fuel assemblies 22. A rod cluster control mechanism 80, positioned above the top nozzle 62, supports a plurality of the controls 78. The control mechanism has an internally threaded cylindrical hub member 82 with a plurality of radially extending flukes or arms 52 that form the spider previously noted with regard to FIG. 2. Each arm 52 is interconnected to a control rod 78, such that the control rod mechanism 80 is operable to move the control rods vertically in the guide thimbles 84 to thereby control the fission process in the fuel assembly 22 under the motive power of a control rod drive shaft 50 which is coupled to the control rod hub 80, all in a well known manner.

The newer reactors, such as the AP1000 nuclear plant design offered by Westinghouse Electric Company LLC, Cranberry Township, Pennsylvania, employ two different types of control rods, i.e., the traditional control rods (black control rods) and gray control rods, the latter having a reduced reactivity worth, i.e., control rods that absorb fewer neutrons per unit area than the traditional control rods. The gray control rods are employed to implement a MSHIM operation and control strategy which has as an objective constant axial offset control. The term MSHIM is derived from the fact that reactivity control uses the gray control rod banks as a "mechanical shim" rather than the chemical shim, i.e., changes in soluble boron concentration, employed in a number of operating commercial reactors today, in order to provide fine reactivity control. the MSHIM strategy employs two independently controlled control rod groups to provide fine control of both the core reactivity and axial power distribution during a wide range of operational scenarios.

In the AP1000 reactor design, the MSHIM operation and control strategy is implemented by a digital rod control system that automatically controls the core reactivity (reactor coolant system temperature) using four banks of gray control rods and two banks of traditional control rods, all moving in a defined overlap. Furthermore, automatic axial power distribution (i.e., the axial offset, also known as the core axial flux difference) control is provided using a single, heavy bank of traditional control rods which move independently of the reactivity control banks. Changes in the concentration of the chemical shim within the reactor coolant is generally limited to only that required to directly compensate for fuel and/or burnable absorber depletion during a given fuel cycle.

The digital rod control system that is responsible for implementing the MSHIM operation and control strategy is basically characterized by the use of two separate rod controllers that independently maintain the reactor temperature and core power distribution, respectively within preselected bands. In order to achieve stable reactor control over the range of anticipated operating scenarios, the two rod controllers are interdependent in certain aspects. For instance, there is a prioritization scheme for the two rod controllers in scenarios where both controllers determine that rod motion is demanded. In such a case, the controller responsible for maintaining core power (average core temperature) in a specified band is given priority. However, it has been recognized by the inventors hereof that there are certain circumstances where core operation could be further improved by deviating from this strategy.

Accordingly, it is an object of the embodiments hereafter described to provide a new operating strategy that will further enhances core stability and fuel performance.

SUMMARY

These and other objects are achieved by the inventions hereafter claimed which provide for a method of operating a pressurized water reactor that has a core of a plurality of fuel assemblies and at least a first bank of control rods that are primarily moved into and out of selected fuel assemblies in the core to adjust the axial flux difference to substantially maintain or restore the axial flux difference within a target band. Furthermore, the pressurized water reactor has at least a second bank of control rods that are primarily moved into and out of other selected fuel assemblies in the core to adjust the average temperature of the core to substantially maintain or return the average temperature to within a second target band. The operation of the first bank of control rods and the second bank of control rods is such that the first bank of control rods and the second bank of control rods are not moved together. The method gives the second bank of control rods priority of movement when the first bank of control rods and the second bank of control rods receive a demand signal at the same time to move in different directions. Furthermore, the method gives the first bank of control rods priority of movement when the first bank of control rods and the second bank of control rods receive a demand signal at the same time to move in the same direction. In one embodiment, when the first bank of control rods is moving and the second bank of control rods gets a signal instructing the second bank of control rods to move in a different direction, the first bank of control rods will stop moving and the second bank of control rods will take over movement as it was instructed.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
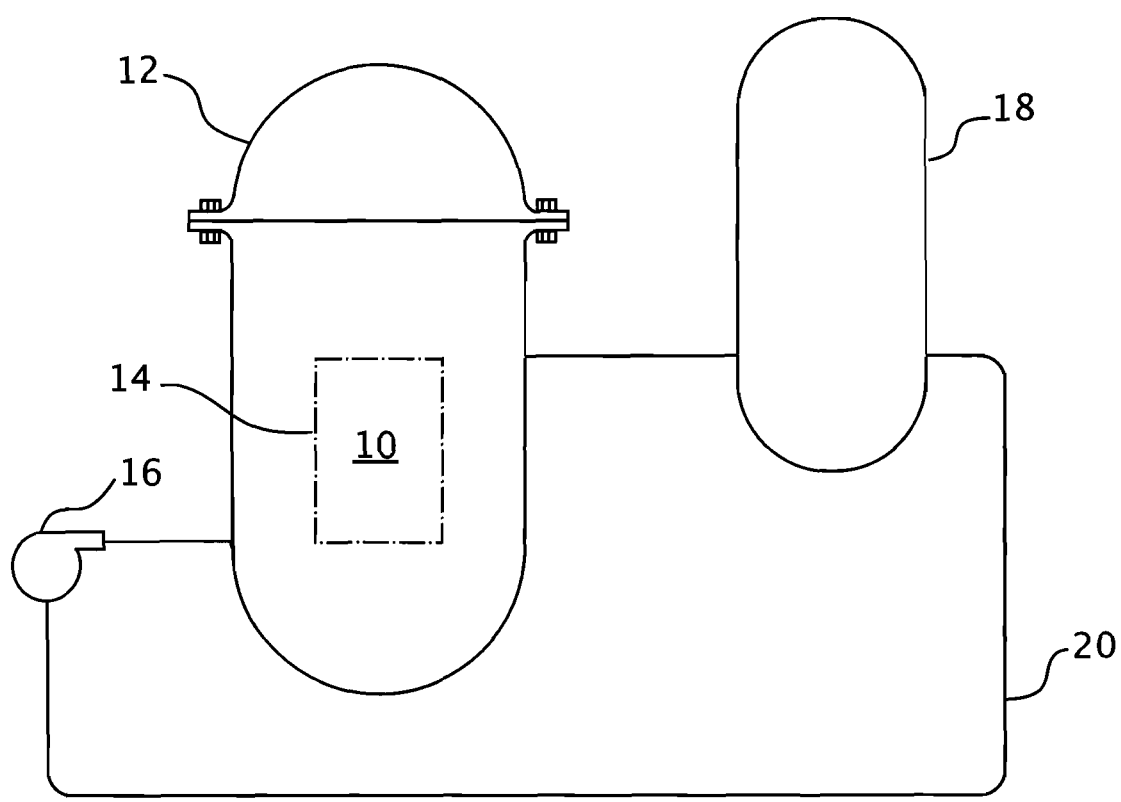
FIG. 1 is a simplified schematic of a nuclear reactor system to which the embodiments described hereafter can be applied.
Figure 2:
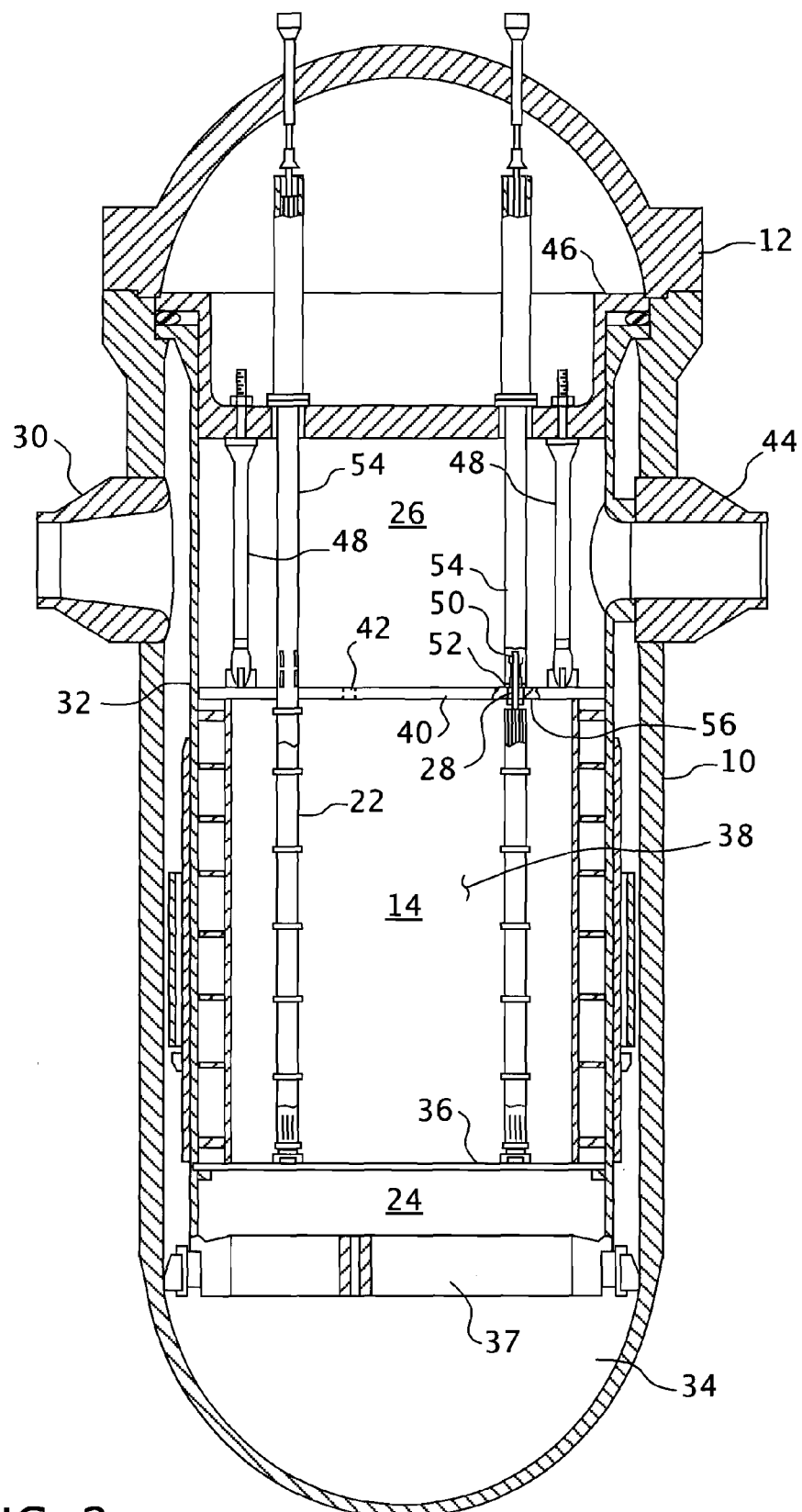
FIG. 2 is an elevational view, partially in section, of a nuclear reactor vessel and internal components to which the embodiments described hereafter can be applied.
Figure 3:
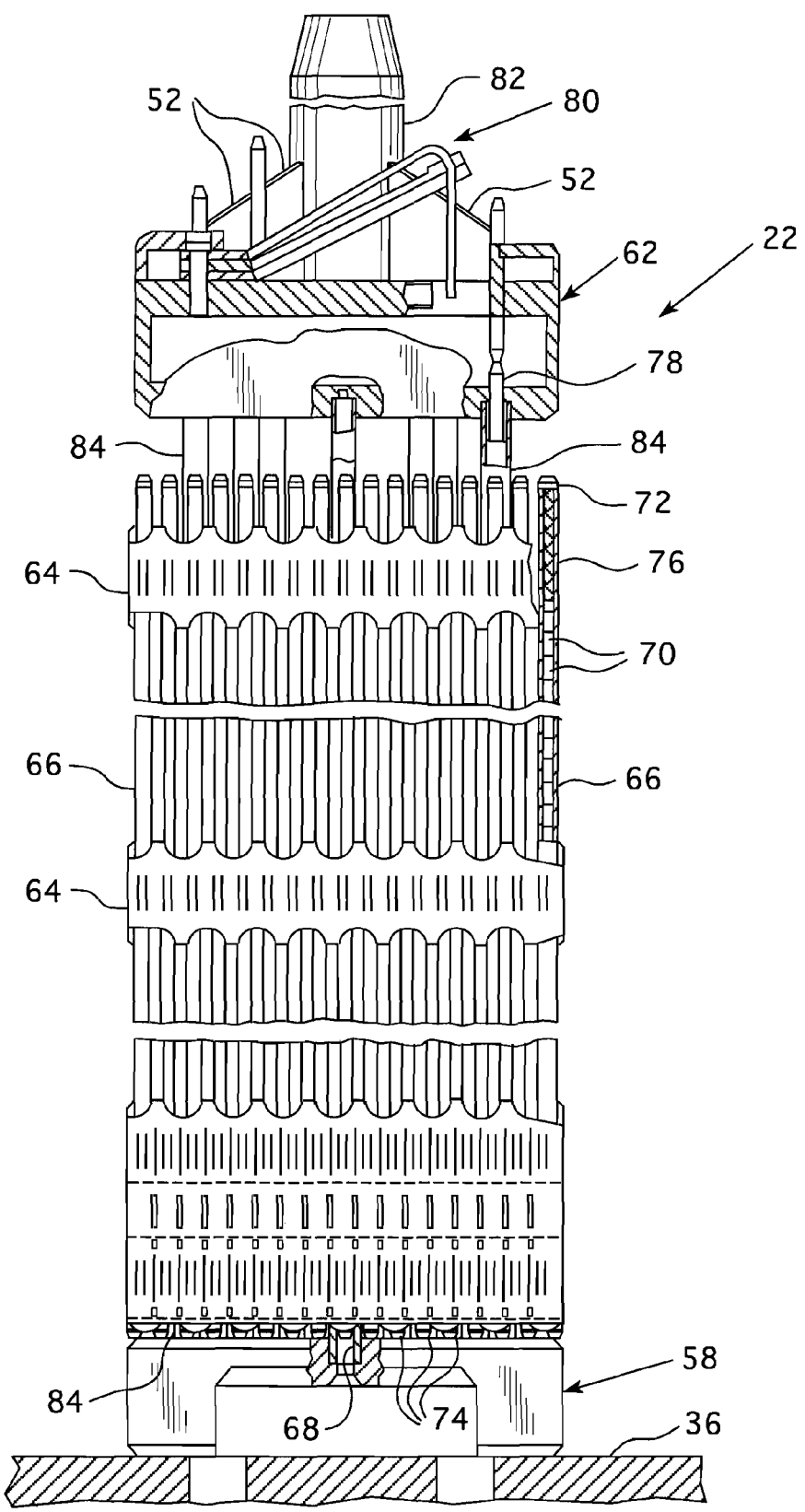
FIG. 3 is an elevational view, partially in section, of a fuel assembly illustrated in vertically shortened form, with parts broken away for clarity.
Figure 4:
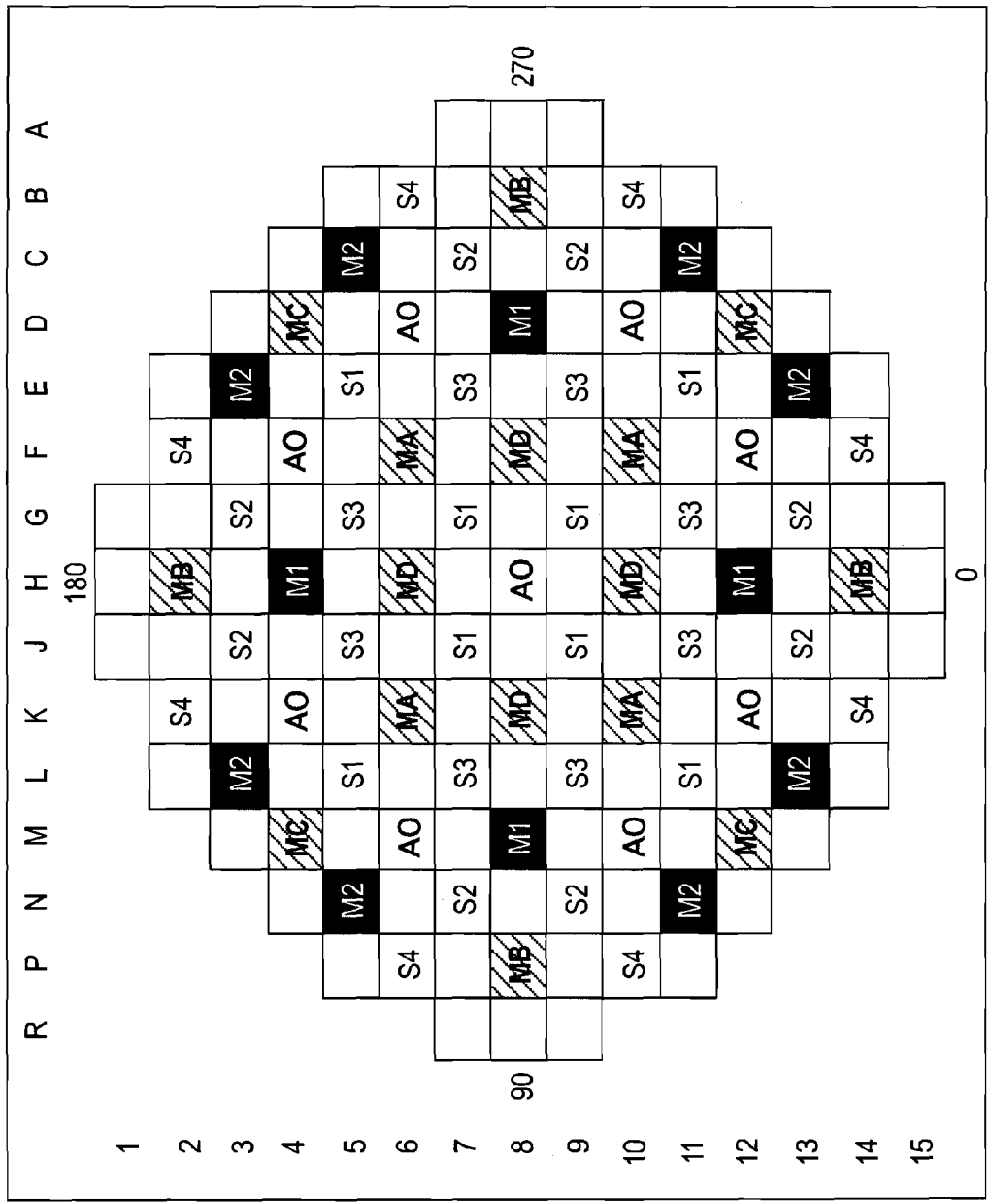
FIG. 4 is a core map showing the different control rod banks employed by the embodiments described hereafter.
Figure 5A:
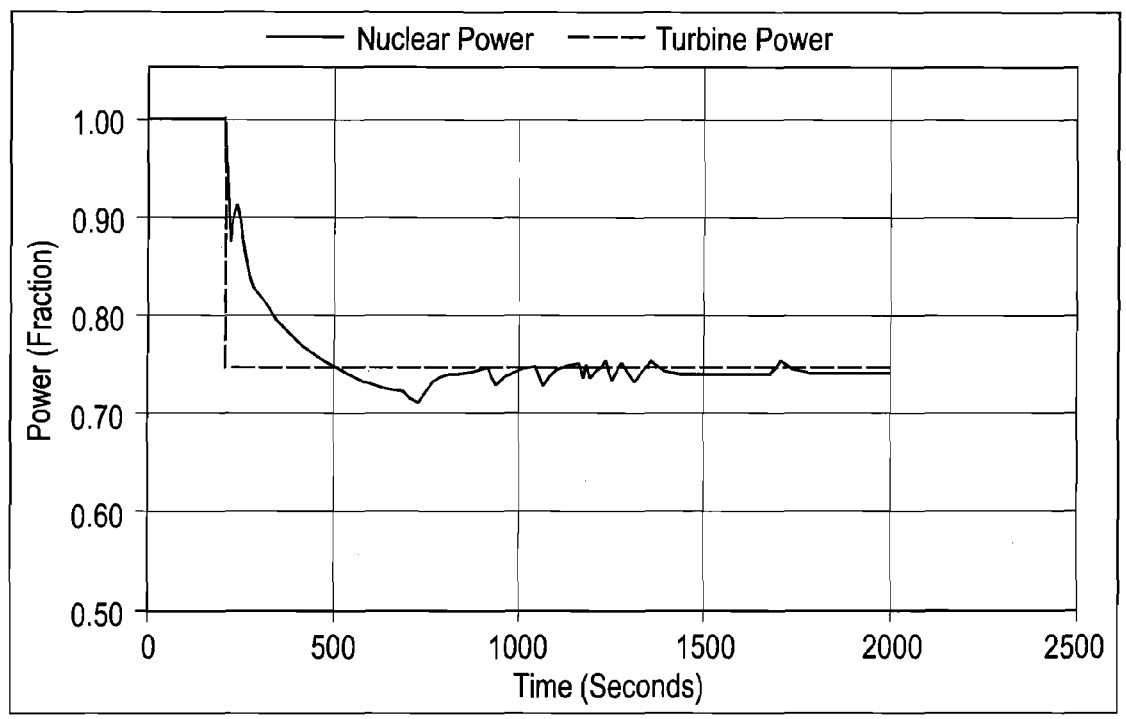
FIGS. 5A, 5B, 5C and 5D are graphical representations showing the effects on power fraction, temperature, AFD and control rod movement of a step power decrease from 100% to 75% employing a standard AP1000 M and AO bank control strategy.
Figure 5B:
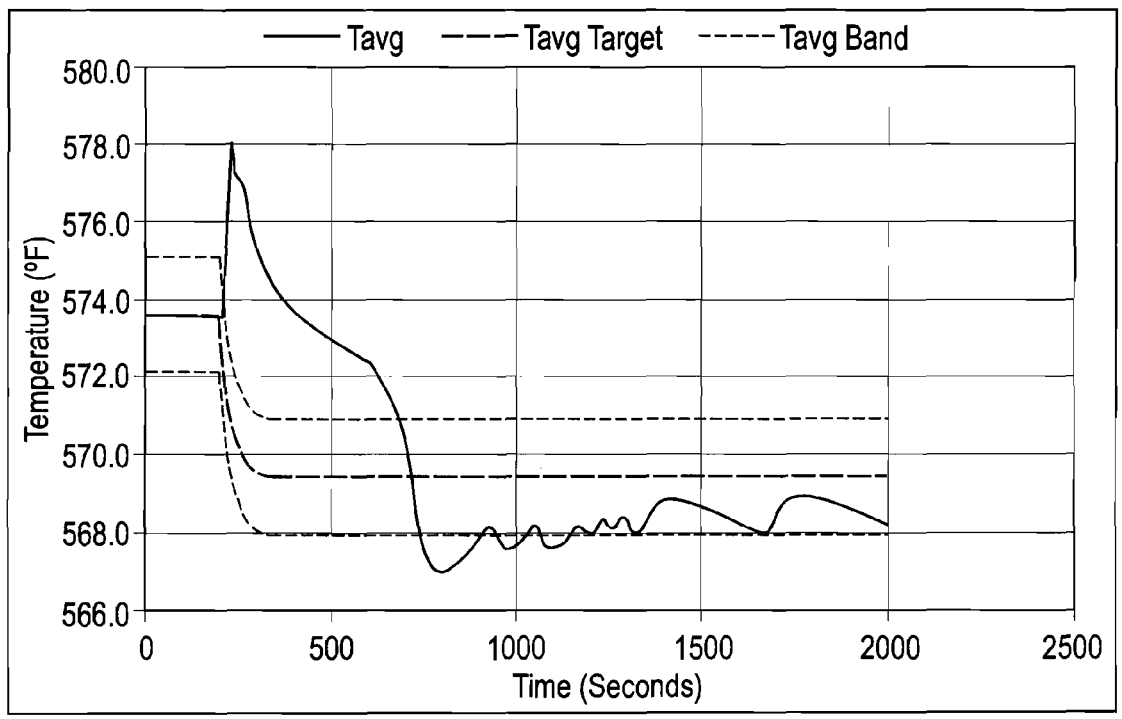
Figure 5C:
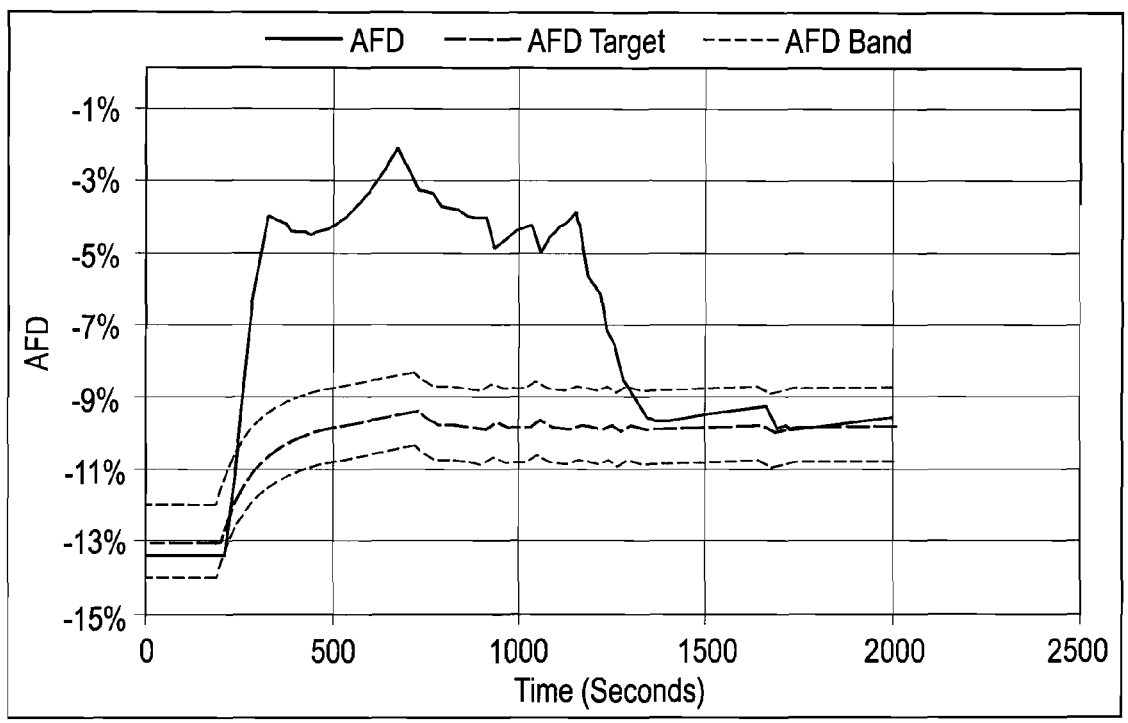
Figure 5D:
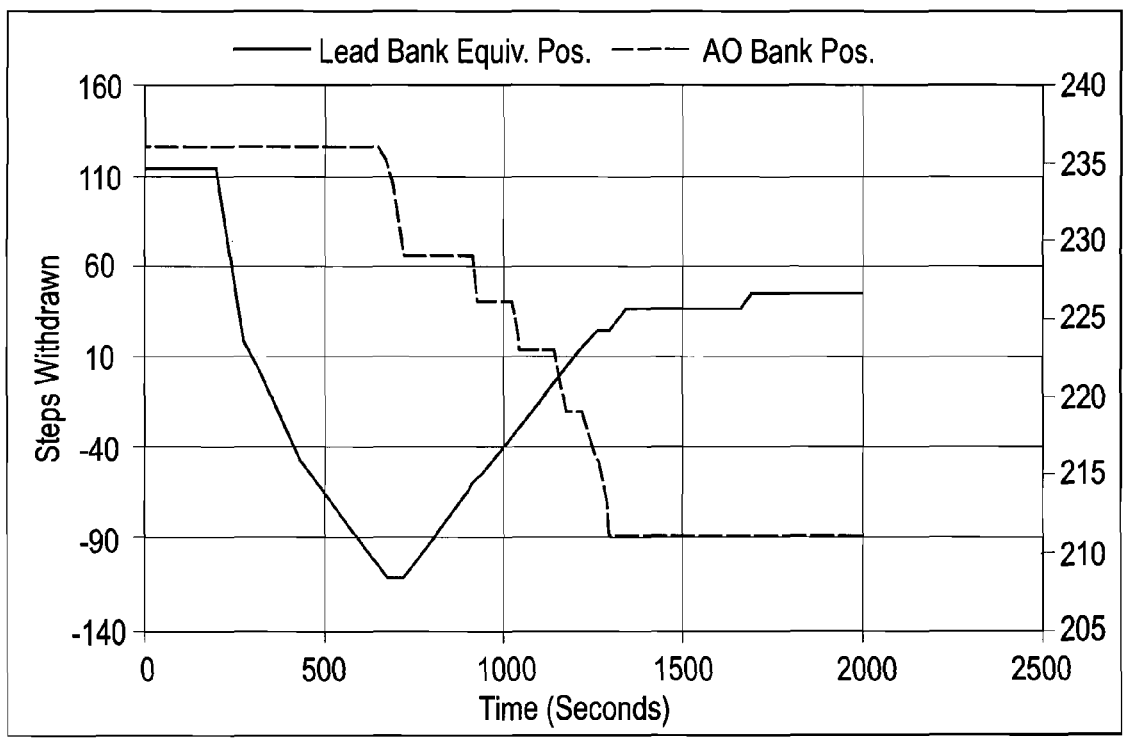

There are two aspects of reactor control in reactors that employ the AP1000 design. The M control banks (MA, MB, MC, MD, M1 and M2) automatically regulate the average reactor coolant temperature ($T_{avg}$) and the AO bank of rods automatically regulates the core axial flux difference (AFD). A core map which shows the location of each of the banks of control rods is shown in FIG. 4 and Table 1 identifies the types of rods employed by each of the banks, the number of clusters within each bank and their function.

TABLE 1

| Bank ID | Group Association | Cluster Design Type | # of Clusters |
|---|---|---|---|
| MA | MSHIM Control | Gray (GRCA) | 4 |
| MB | | | 4 |

TABLE 1-continued

| Bank ID | Group Association | Cluster Design Type | # of Clusters |
|---|---|---|---|
| MC | | | 4 |
| MD | | | 4 |
| M1 | | Black (RCCA) | 4 |
| M2 | | | 8 |
| AO | Axial Offset Control | | 9 |
| S1 | Shutdown | | 8 |
| S2 | | | 8 |
| S3 | | | 8 |
| S4 | | | 8 |
| | Total | | 69 |

The $T_{avg}$ controller moves the M banks into or out of the core during power maneuvers to regulate the coolant temperature and restore it to a +/−1.5° F. deadband around a programmed value which is a function of the turbine load. Similarly, the AFD controller regulates the axial core power distribution and restores it to a +/−1% deadband around a target value. An assumption in the AP1000 reactor design safety analysis requires the $T_{avg}$ control to have precedence over AFD control. As a result, during a power maneuver, the M banks move first to regulate the $T_{avg}$. As they move, they cause changes in AFD. When the coolant reaches its +/−1.5° F. control deadband, the M banks stop and the AO bank begins to regulate the AFD. The AO bank will move until the AFD is within its target deadband. The movement of the AO bank may cause the coolant temperature to exceed its control deadband. If this occurs, the AO bank will stop and the M banks will again move to correct the coolant temperature. When this is completed the AO bank will move again to resume the AFD correction.

FIG. 5, which includes the graphs shown in FIGS. 5A, 5B, 5C and 5D, shows the AFD, $T_{avg}$, M and AO bank changes during a typical operation transient. Because the M banks have preference, the $T_{avg}$ transient is well regulated. The AO bank correction near the end of the transient restores the AFD to within 1% of its target. In this example, the maximum deviation of the AFD from its control band is 8%. For more severe transients or under off normal conditions, the AFD deviation could be large enough to compromise peaking factors or pellet clad interaction limits (values as large as 20-30% have been seen in preliminary calculations).

A more detailed understanding of the MSHIM operation and control strategy can be found in a paper entitled ROBUSTNESS OF THE MSHIM OPERATION AND CONTROL STRATEGY IN THE AP1000 DESIGN (Paper No. ICONE17-75314) which was given at the Proceedings of the 17$^{th}$ International Conference on Nuclear Engineering, Jul. 12-16, 2009, Brussels, Belgium.

The inventors have recognized that allowing the AO bank to regulate the AFD during a plant operational transient, even where the average reactor coolant is outside its deadband, would reduce AFD deviations; but, at first glance, the $T_{avg}$ control preference requirement imposed by the AP1000 safety analysis would seem to preclude that type of operation. However, close examination of the response characteristics of the M and AO banks does provide an opportunity for AFD correction during a major portion of any power change. Specifically:
1. Moving either the AO or M banks more deeply in to the core will cause a reduction in $T_{avg}$ and moving either of them further out of the core will cause $T_{avg}$ to increase.
2. Moving the AO bank (within its allowed operating band) more deeply into the core will cause the AFD to become more negative and moving it further out of the core will cause the AFD to become more positive.

Accordingly, the underlying concepts provided for herein are:
1. If the M banks are moving into the core to reduce the $T_{avg}$ and the AO bank has a demand to make the AFD more negative, allowing the AO bank to move will both reduce the $T_{avg}$ and correct the AFD.
2. Similarly, if the M banks are moving out of the core to increase the $T_{avg}$ and the AO bank has a demand to make the AFD more positive allowing the AO bank to move will both increase the $T_{avg}$ and correct the AFD.

Implementation of these concepts can be stated as follows: In the AP1000, when the AO and M banks both have a demand to move in the same direction (both in or both out of the core), disable the M banks and let the AO bank move. This will produce the correct movement of the $T_{avg}$ and the AFD.

Figure 6:
FIG. 6 is a graphical representation that illustrates the AFD variations as M banks are inserted into the core.

The normal observation would be that allowing the AO and M banks to move together (since they both have a demand to move in the same direction) would improve regulation of both $T_{avg}$ and AFD. This is true for $T_{avg}$ control. Allowing both banks to move in the same direction would speed up the correction of $T_{avg}$. However, the same is not true for AFD control. The reactivity worths and overlaps of the M banks in the AP1000 design are such that as the M banks move in one direction (in or out) they alternately cause the AFD to become more negative and more positive. This is shown in FIG. 6. Hence, allowing both the AO and M banks to move simultaneously to speed up $T_{avg}$ control is likely to be detrimental to AFD control. In addition, the design and arrangement of the rod control power supplies may preclude simultaneous movement of the AO and M banks.

The fundamental principle underlying the inventions claimed hereafter is the fact that natural core feedbacks, i.e., changes in moderator temperature/density, generally result in consistent responses in $T_{avg}$ and AFD. For instance, when core power is reduced, reactivity increases resulting in an increased $T_{avg}$. Coincidentally, AFD also becomes more positive. Both would require rod insertion to compensate. The invention claimed hereafter takes advantage of the fact that the heavy control rods, i.e., the black control rods, used for AFD/A0 control inherently have higher reactivity worth than the gray rods in the M banks normally used for $T_{avg}$ control; meaning that the AO bank would compensate for both parameters under such conditions. In other words, the inherent, short-term core feedbacks are found to be naturally consistent and the method claimed hereafter leverages that consistency. This is not necessarily the case for the long-term core feedbacks, e.g., xenon transients, but the time spans are much longer for these affects, such that the "independence" of the two controllers is adequate to control for these long-term effects.

Figure 7:
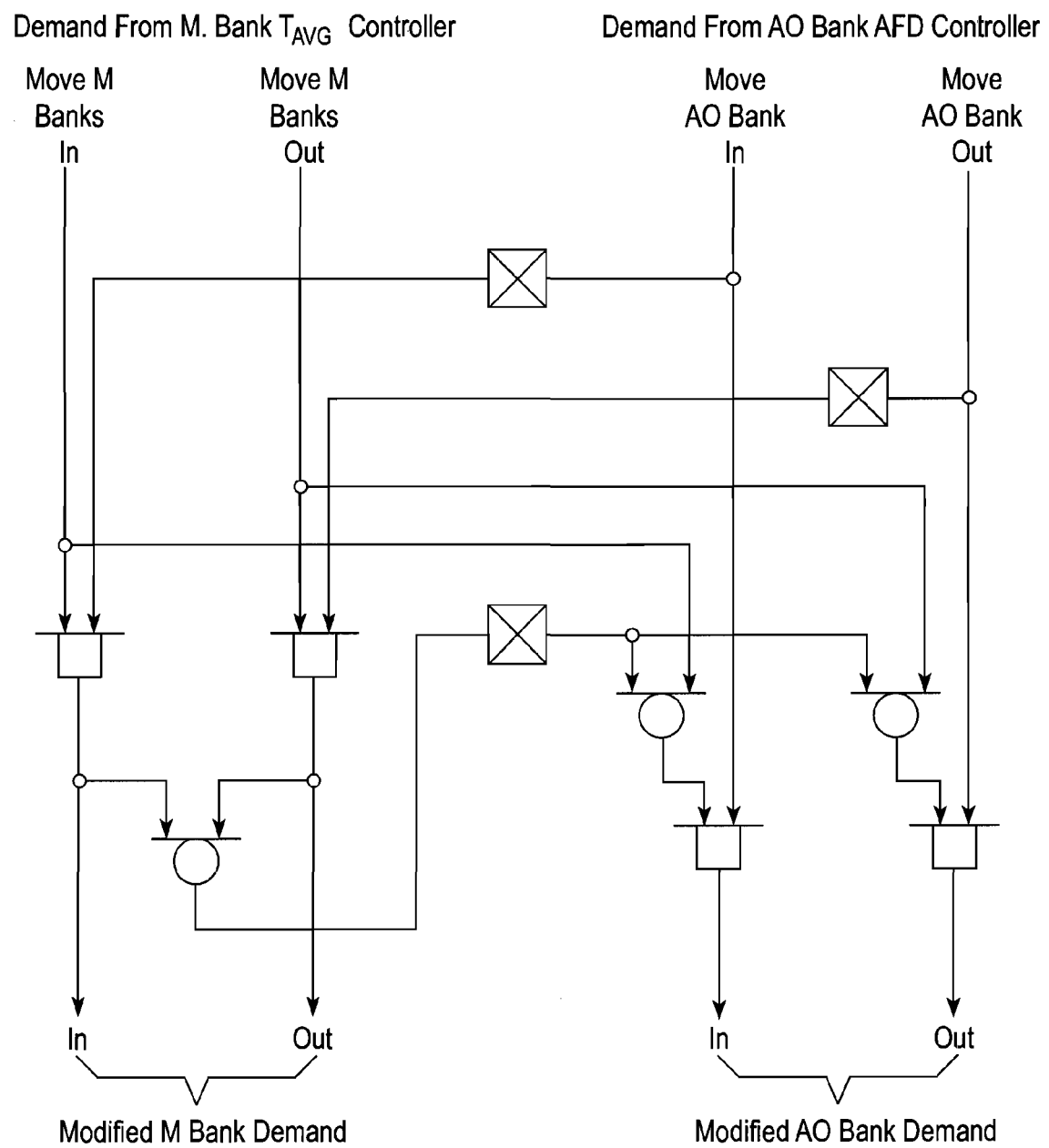
FIG. 7 is a diagrammatic representation of a logic flow chart showing an arrangement of logic gates that will implement the control strategy described herein.
Figure 8A:
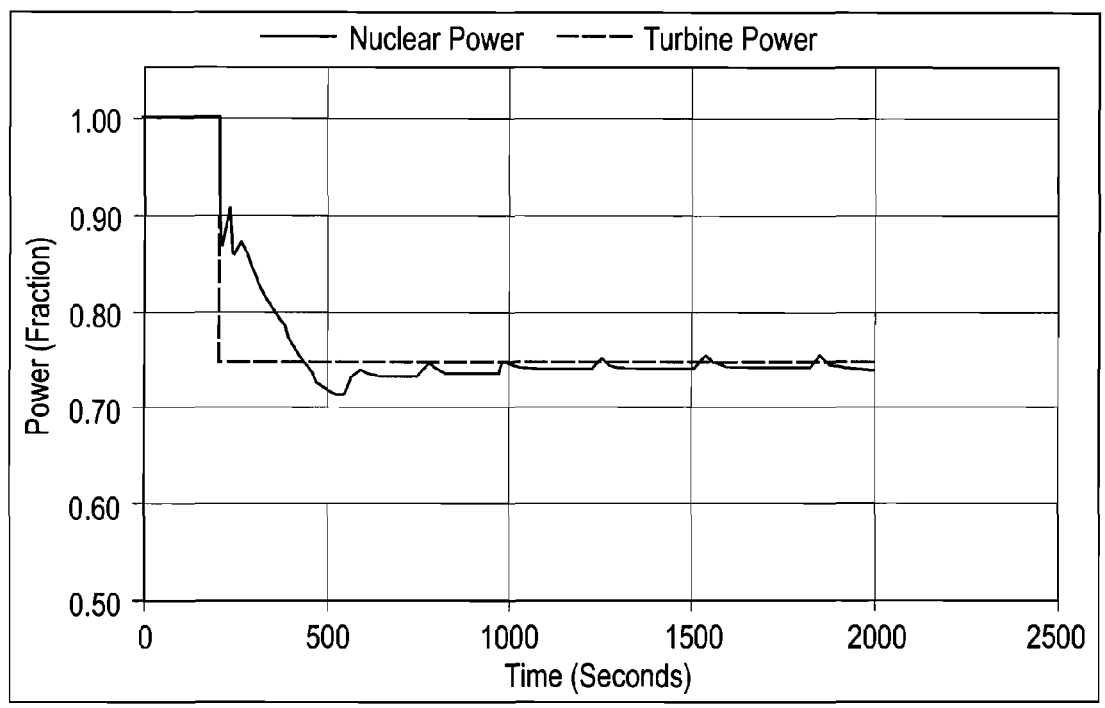
FIGS. 8A, 8B, 8C and 8D are graphical representations of core parameter changes corresponding to those shown in FIGS. 5A, 5B, 5C and 5D, but resulting from the control strategy described herein.
Figure 8B:
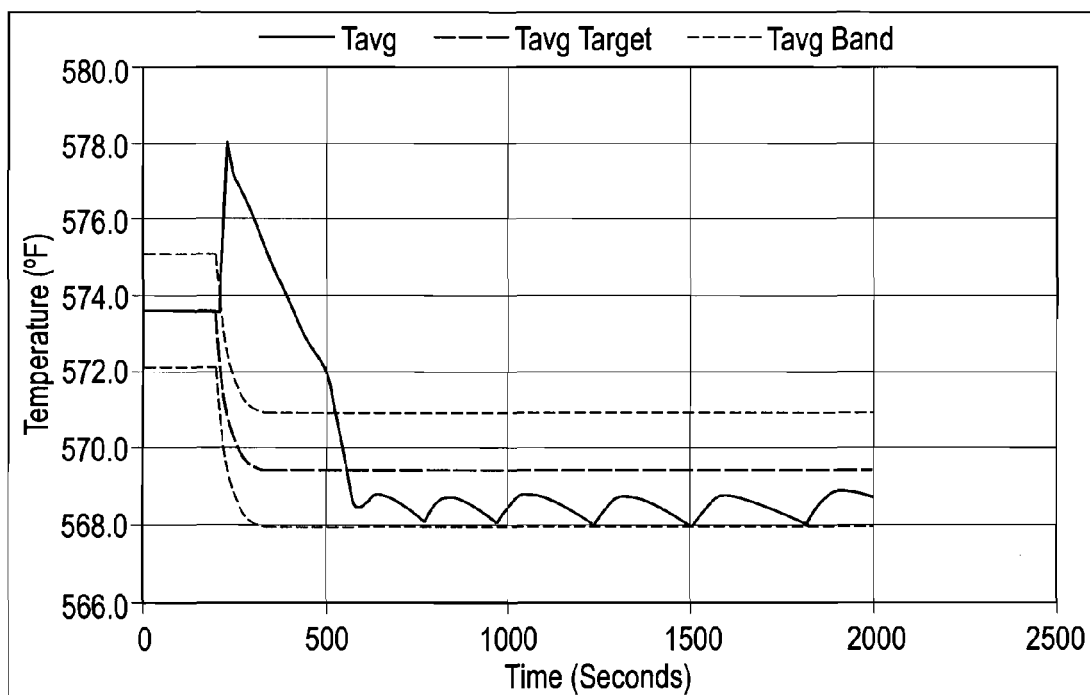
Figure 8C:
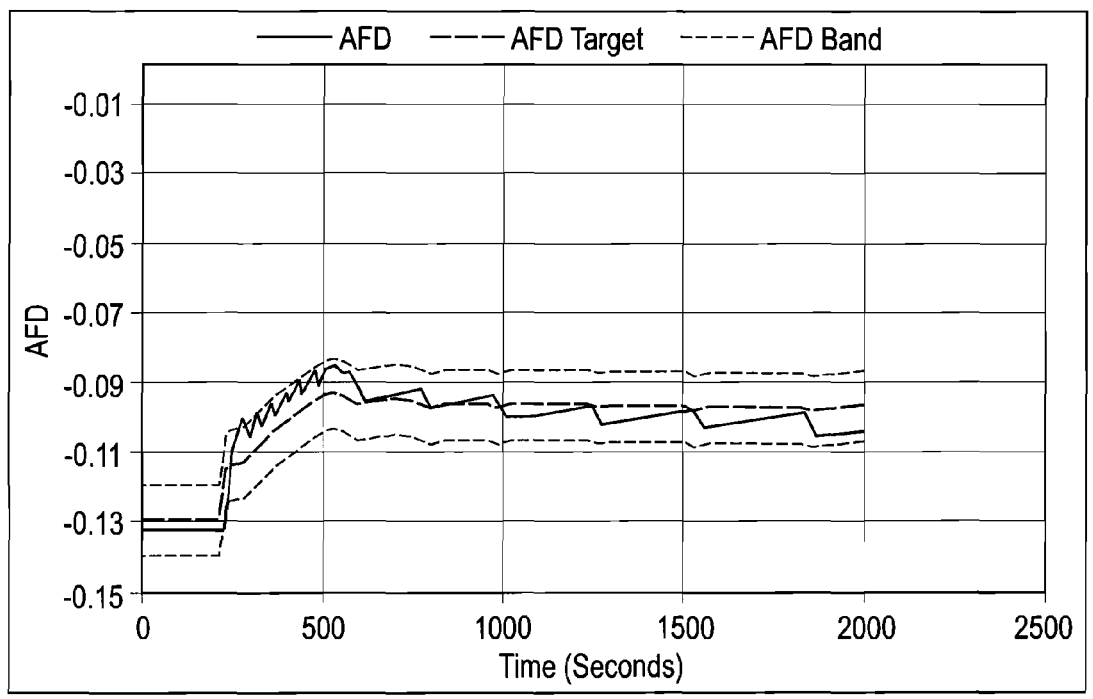
Figure 8D:
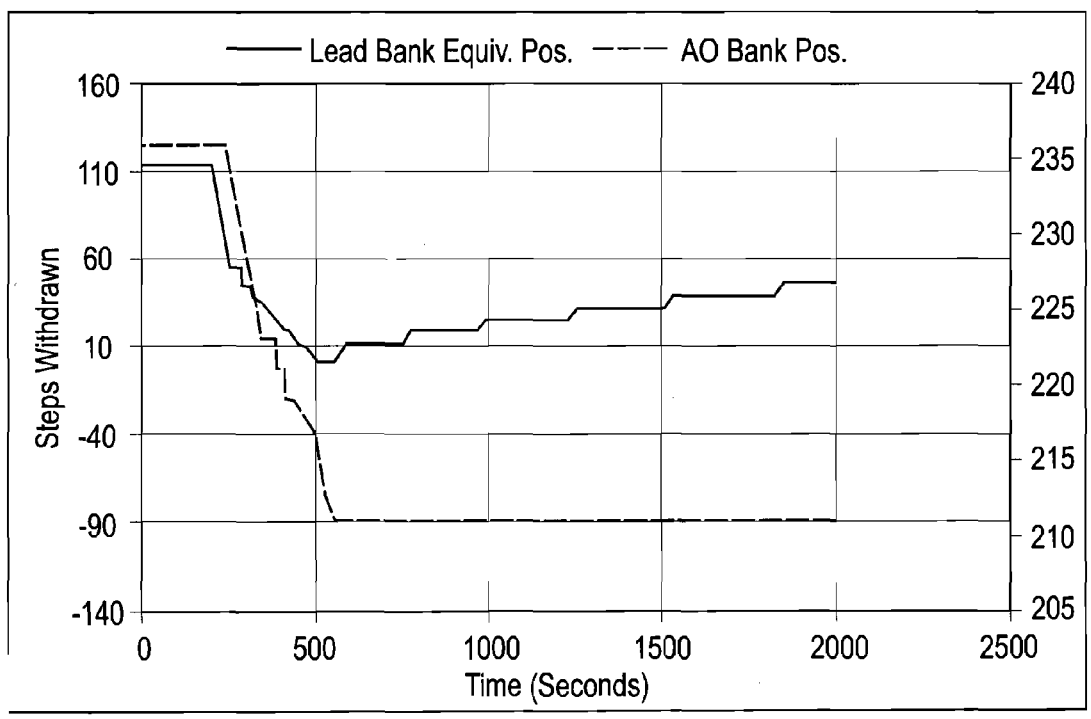

A control system logic arrangement that will implement the concepts claimed hereafter is shown in FIG. 7. The reactor control system and the AFD control system will generate a demand for M and AO bank movement based on the need for correction of the coolant average temperature ($T_{avg}$) or core axial power distribution. The demand to reduce $T_{avg}$ will move the M banks in except when there is a demand to make the AFD more negative. In this case, the M bank demand will be ignored and the AO bank will move in to reduce the $T_{avg}$ at the same time make the AFD more negative. The demand to increase $T_{avg}$ will move the M banks out except when there is a demand to make the AFD more positive. In this case, the M bank demand will be ignored and the AO bank will move out to increase the $T_{avg}$ and at the same time make the AFD more positive. The demand to make the AFD more negative will move the AO bank in only when there is a corresponding demand to move the M banks in or when the M bank demand is in its control deadband. Similarly, a demand to make the AFD positive will move the AO bank out only when there is a corresponding demand to move the M banks out or when the M bank demand is in its controlled deadband. When the AO bank reaches its deadband and stops movement, the M banks will take over movement if $T_{avg}$ is not in its deadband. This logic, shown in FIG. 7, demonstrates how $T_{avg}$ control is given preference over AFD control while allowing AFD control for the majority of the time during an operational transient. FIGS. 8A, 8B, 8C and 8D show the effect of this control strategy on the same transient previously plotted in FIG. 5 for the prior art control strategy. The improvement in AFD control, without compromising $T_{avg}$ control and while giving $T_{avg}$ preference, is significant.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of operating a pressurized water reactor that has a core of a plurality of fuel assemblies and at least a first bank of control rods that are primarily moved into and out of selected fuel assemblies in the core to adjust the axial flux difference to substantially maintain or restore the axial flux difference within a first target band and at least a second bank of control rods that are primarily moved into and out of other selected fuel assemblies in the core to adjust the average temperature of the core to substantially maintain or return the average temperature to within a second target band, wherein the first bank of control rods and second bank of control rods are not moved together, comprising the steps of:
   giving the second bank of control rods priority of movement when the first bank of control rods and the second bank of control rods receive at the same time a demand signal to move in different directions; and
   giving the first bank of control rods priority of movement when the first bank of control rods and the second bank of control rods receive at the same time a demand signal to move in the same direction.

2. The method of claim 1 wherein when the first bank of control rods is moving and the second bank of control rods gets a signal instructing the second bank of control rods to move in a different direction, the first bank of control rods will stop moving and the second bank will take over movement as it was instructed.

3. The method of claim 1 wherein when the first bank of control rods has priority of movement and moves to alter the axial flux difference to within a first preselected deadband at which the first bank of control rods stops movement, the second bank of control rods will start movement if the average temperature is not within a second preselected deadband.

* * * * *